United States Patent
Balijepalli et al.

(10) Patent No.: US 10,100,217 B2
(45) Date of Patent: *Oct. 16, 2018

(54) AQUEOUS COMPOSITIONS HAVING POLYALKOXYLATE SALTS FOR IMPROVED OPEN TIME

(71) Applicant: Dow Global Technologies LLC, Midland, MI (US)

(72) Inventors: Sudhakar Balijepalli, Midland, MI (US); Arkady L. Krasovskiy, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,059

(22) Filed: Mar. 23, 2017

(65) Prior Publication Data

US 2017/0275489 A1 Sep. 28, 2017

Related U.S. Application Data

(60) Provisional application No. 62/314,021, filed on Mar. 28, 2016.

(51) Int. Cl.
| | |
|---|---|
| *C08K 5/06* | (2006.01) |
| *C09D 133/12* | (2006.01) |
| *B05D 3/00* | (2006.01) |
| *C09D 5/02* | (2006.01) |
| *C08K 3/32* | (2006.01) |
| *C09D 7/61* | (2018.01) |
| *C09D 7/63* | (2018.01) |
| *C09D 7/65* | (2018.01) |
| *C08K 13/02* | (2006.01) |

(52) U.S. Cl.
CPC ........... *C09D 133/12* (2013.01); *B05D 3/007* (2013.01); *C08K 3/32* (2013.01); *C09D 5/027* (2013.01); *C09D 7/61* (2018.01); *C09D 7/63* (2018.01); *C09D 7/65* (2018.01); *C08K 13/02* (2013.01); *C08K 2003/329* (2013.01)

(58) Field of Classification Search
CPC .......... C09D 133/12; C09D 7/61; C09D 7/63; C09D 7/65; C08L 33/06
See application file for complete search history.

(56) References Cited

U.S. PATENT DOCUMENTS

| | | | |
|---|---|---|---|
| 4,325,856 A | 4/1982 | Ishikawa et al. | |
| 4,502,977 A | 3/1985 | Buriks et al. | |
| 4,654,397 A | 3/1987 | Mueller-Mall et al. | |
| 4,814,373 A | 3/1989 | Frankel et al. | |
| 5,236,987 A | 8/1993 | Arendt | |
| 6,171,004 B1 | 1/2001 | Derhammer | |
| 6,762,230 B2 | 7/2004 | Brandenburger et al. | |
| 6,933,337 B2 | 8/2005 | Lang et al. | |
| 7,705,082 B2 | 4/2010 | Porzio et al. | |
| 2001/0031826 A1 | 10/2001 | Laubender et al. | |
| 2003/0229171 A1 | 12/2003 | Zhao et al. | |
| 2005/0084466 A1 | 4/2005 | Mullay et al. | |
| 2006/0241230 A1 | 10/2006 | Porzio et al. | |
| 2009/0186972 A1 | 7/2009 | Zong et al. | |
| 2009/0292058 A1 | 11/2009 | Berry-Walker et al. | |
| 2010/0016485 A1 | 1/2010 | Zong et al. | |
| 2010/0280165 A1 | 11/2010 | Terrenoire et al. | |
| 2011/0105323 A1* | 5/2011 | Schneider | A01N 37/38 504/100 |
| 2011/0144248 A1 | 6/2011 | Zong et al. | |
| 2012/0258249 A1 | 10/2012 | Adamson et al. | |
| 2013/0023764 A1 | 1/2013 | Brown et al. | |
| 2014/0256861 A1 | 9/2014 | Li | |
| 2014/0256862 A1 | 9/2014 | Palmer, Jr. et al. | |
| 2017/0275490 A1* | 9/2017 | Balijepalli | C09D 7/1216 |

FOREIGN PATENT DOCUMENTS

| | | |
|---|---|---|
| EP | 1340792 A1 | 9/2003 |
| EP | 2457960 A1 | 5/2012 |
| WO | 2002097159 A2 | 12/2002 |
| WO | 2011158102 A1 | 12/2011 |
| WO | 2014025567 A1 | 4/2014 |
| WO | 2014058864 A1 | 4/2014 |
| WO | 2014099821 A2 | 6/2014 |

OTHER PUBLICATIONS

Non-Final Office Action for U.S. Appl. No. 15/467,326; dated Feb. 27, 2018; 9 pages.

* cited by examiner

*Primary Examiner* — Hannah J Pak
(74) *Attorney, Agent, or Firm* — Karl E. Stauss; Cantor Colburn LLP

(57) ABSTRACT

The present invention provides aqueous compositions which have low or zero volatile organic content (VOC) comprising (i) an open time additive composition of one or more phosphorus acid salts, preferably a phosphoric acid salt, and one or more polyalkoxylates having from 2 to 15 polyalkoxylate chains and an ethylene oxide (EO) content ranging from 20 to 70 wt. %, based on the total weight of polyalkoxylate solids in the composition. The (i) additive compositions may have a solids content as high as 95 wt. %. Further, the compositions may comprise (ii) one or more aqueous polymer, such as for use in coatings or non-cementitious mortars.

10 Claims, No Drawings

AQUEOUS COMPOSITIONS HAVING POLYALKOXYLATE SALTS FOR IMPROVED OPEN TIME

The present invention relates to aqueous compositions that comprise (i) one or more phosphorus acid salts, preferably a phosphoric acid salt, and one or more polyalkoxylates having from 2 to 15 polyalkoxylate chains and an ethylene oxide (EO) content ranging from 20 to 70 wt. %, based on the total weight of polyalkoxylate solids in the composition. More particularly, it relates to low volatile organic content (VOC) aqueous compositions, such as aqueous polymer compositions, for example, for use in coating compositions, comprising (i) the one or more phosphorus acid salts and one or more polyalkoxylates of the formula I-[AO$_n$H]$_f$, wherein I is an organic active hydrogen containing compound; wherein AO is an alkylene oxide that comprises ethylene oxide (EO) or EO combined with propylene oxide (PO) and/or butylene oxide (BO) in a random order or in an oligomer having blocks, preferably, having at least one block of EO; wherein n is the total number of AO groups; and, wherein f is the total number of active hydrogen groups in I, which ranges from 2 to 15 and and (ii) one or more aqueous polymer compositions, such as emulsion polymers, preferably, vinyl or acrylic emulsion polymers.

Waterborne or aqueous coating compositions have recently been developed with lower amounts of volatile organic compounds (VOCs). The aqueous compositions may comprise emulsion polymers having a measured (DSC) glass-transition temperature (Tg) of from 10 to 30° C., and rely on the addition of VOCs as coalescing agents to enable film formation at ambient temperature and subsequent curing. The presence of VOCs in an aqueous paint or coating composition formulation also imparts better open time and freeze-thaw (F/T) stability, as well as enables better flow and leveling, substrate wetting and paint film defoaming, which can lead to better adhesion and surface appearance properties. A number of these properties are compromised as the market moves to low/zero VOC coatings with low $T_g$ zero VOC binders due to fast film formation. Therefore there is market demand for a differentiated technology that significantly improves open time and/or wet edge time of aqueous coating compositions with benefits in final appearance of paints during application.

U.S. Pat. No. US2009/0186972A1 to Zong et al. discloses aqueous compositions for use with emulsion polymers that provide enhanced open time and freeze thaw stability, wherein the compositions comprise alkoxylated tristyryl phenols and salts thereof which can be polymerizable surfactants. The Zong et al. patent says very little about how the alkoxylated tristyryl phenols are made. However, the additive of Zong is used in amounts of from 1.6 to 7.5 wt. %, based on the weight of an aqueous emulsion polymer.

Accordingly, the present inventors have sought to solve the problem of providing simple to make additives that enable one to make and use aqueous compositions that exhibit good open time properties for use as coatings paints, especially high solids and elastomeric polymer compositions.

SUMMARY OF THE INVENTION

1. In accordance with the present invention, low volatile organic content (VOC) aqueous compositions comprise (i) an additive composition of one or more phosphorus acid salts, preferably a phosphoric acid salt, and one or more polyalkoxylates having from 2 to 15 or, preferably, from 3 to 10, or, more preferably, from 3 to 8 polyalkoxylate chains and an ethylene oxide (EO) content ranging from 20 to 70 wt. %, or, preferably, from 20 to 50 wt. %, based on the total weight of polyalkoxylate solids in the composition.

2. In accordance with the aqueous compositions of the present invention as in item 1, above, wherein the total amount of the (i) additive composition ranges from 30 to 95 wt. % or, preferably, from 30 to 80 wt. %, as solids. 3. In accordance with the aqueous compositions of the present invention as in items 1 or 2, above, wherein the phosphorus acid salt concentration in the (i) additive composition ranges from 0.1 to 2 or, preferably, from 0.2 to 1 millimoles/g as solids, based on the total solids of the additive composition.

4. In accordance with the aqueous compositions of the present invention as in any one of items 1, 2, or 3, above, wherein the (i) additive composition comprises one or more polyalkoxylates of the formula I-[AO$_n$H]$_f$, wherein I is an organic active hydrogen containing compound; wherein AO is an alkylene oxide that comprises ethylene oxide (EO) or EO combined with propylene oxide (PO) and/or butylene oxide (BO) in a random order or in an oligomer having blocks, preferably, having at least one block of EO; wherein n is the total number of AO groups and may range from 1 to 50, or, preferably, from 2 to 20; and, wherein f is the total number of active hydrogen groups in I, which ranges from 2 to 15 or, preferably, from 3 to 10, or, more preferably, from 3 to 8.

5. In accordance with the aqueous compositions of the present invention as in any one of items 1, 2, 3, or 4, above, wherein in the (i) additive composition, the one or more phosphorus acid salts is a phosphate or a polyphosphate salts with a cation chosen from an alkali metals, such as Na$^+$, K$^+$, or Li$^+$, alkaline earth metals, such as Ca$^+$, ammonium, i.e. NH$_4^+$ and quaternary ammonium groups.

6. In accordance with the aqueous compositions of the present invention as in any one of items 1, 2, 3, 4, or 5, above, wherein the (i) additive composition has one or more polyalkoxylates that is a polyalkoxylate of an active hydrogen compound chosen from polyols having 3 or more hydroxyl groups, difunctional aminoalcohols, diamines, triamines, polyamines, and phenolic resins having 3 to 8 hydroxyl groups.

7. In accordance with the aqueous compositions of the present invention as in any one of items 1, 2, 3, 4, 5, or 6, above, wherein the (i) additive composition has one or more polyalkoxylates that is a polyalkoxylate of diethanol amine, glycerol, pentaerythritol, a sugar alcohol, a diamine or a triamine.

8. in accordance with the aqueous compositions of the present invention as in any of items 1, 2, 3, 4, 5, 6, or 7, above, wherein in the (i) additive composition, at least one of the one or more polyalkoxylates has a number average molecular weight (Mn) of from 800 to 10,000 or, preferably, from 800 to 6,000.

9. In accordance with the aqueous compositions of the present invention as in any one of items 1, 2, 3, 4, 5, 6, 7, or 8, above, wherein the (ii) one or more polyalkoxylates is a polyalkoxylate of diethanol amine, glycerol, pentaerythritol, a sugar alcohol, a diamine or a triamine.

10. In accordance with the aqueous compositions of the present invention as in any of items 1, 2, 3, 4, 5, 6, 7, 8, or 9, above, wherein the compositions are aqueous polymer compositions that further comprise (ii) one or more aqueous polymer chosen from aqueous dispersion polymers, aqueous emulsion polymers and mixtures thereof, preferably, one or more vinyl or acrylic emulsion polymers, or, more preferably, at least one vinyl or acrylic emulsion polymer having a measured (DSC) glass transition temperature (measured Tg) of from −100 to 20° C. or, preferably, from −60 to 15° C., such as, for example, an elastomeric emulsion polymer.

11. In accordance with the aqueous polymer compositions of the present invention as in item 10, above, wherein the amount of (i) the additive composition ranges from 0.1 to 5 wt. % or, preferably, up to 2.0 wt. %, as solids, based on the total weight of solids in the composition.

12. In accordance with the aqueous polymer compositions of the present invention as in any one of items 10 or 11, above, wherein the (ii) one or more vinyl or acrylic emulsion polymers contain, in copolymerized form, one or more monomers chosen from $C_1$ to $C_{24}$ alkyl acrylates or $C_1$ to $C_{24}$ alkyl methacrylates, vinyl esters, vinyl aromatics, such as styrene or, preferably, wherein the (ii) one or more vinyl or acrylic emulsion polymers additionally comprise, in copolymerized form, one or more monomer chosen from ethylenically unsaturated carboxylic acid monomers, like (meth)acrylic acid or its salts; ethylenically unsaturated amide monomers, such as acrylamides; phosphorus acid group containing vinyl or acrylic monomers, such as phosphoethyl methacrylate; sulfur acid group containing vinyl or acrylic monomers, such as methacrylamidopropane sulfonic acid or its salts; multiethylenically unsaturated monomers, such as allyl methacrylate; hydroxy-functional monomers; amine-functional monomers; epoxy-functional monomers; keto-functional monomers, and autooxidizable monomers.

13. In accordance with the aqueous polymer compositions of the present invention as in any one of items 10, 11 or 12, above, wherein the aqueous composition has a solids content of from 40 to 85 wt. % or, preferably, from 50 to 85 wt. %, based on the total weight of the total composition.

14. In accordance with the aqueous compositions of the present invention as in any one of items 1 to 13, above, wherein the composition further comprises one or more fillers, extenders; preferably calcium carbonate, calcium oxide, silica, silicates; and/or pigments, such as a white or opacifier pigment, preferably, titanium dioxide, or, preferably, one or more pigment combined with one or more fillers and/or extenders.

15. In accordance with the aqueous compositions of the present invention as in any one of items 1 to 14, above, wherein the aqueous composition has a volatile organic content (VOC) of 150 g/L or less or, preferably, 100 g/L or less, or, more preferably, 50 g/L or less.

16. In accordance with another aspect of the present invention, methods of using the aqueous polymer compositions as in any one of items 10 to 15, above, comprise applying the aqueous polymer compositions to a substrate and drying, preferably, during under ambient conditions.

Unless otherwise indicated, conditions of temperature and pressure are room temperature and standard pressure, also referred to herein as "ambient conditions".

The singular forms "a," "an," and "the" include plural referents unless the context clearly dictates otherwise.

All phrases comprising parentheses denote either or both of the included parenthetical matter and its absence. For example, the phrase "(meth)acrylate" includes, in the alternative, acrylate and methacrylate.

As used herein, the term "acid monomer or anionic monomer" means ethylenically unsaturated carboxylic acid monomer in either the acid or anionic form ($COO^-$).

As used herein, the term "aqueous" means water or water mixed with up to 16 wt. %, or up to 6 wt. %, or, preferably, up to 0.5 wt. % of a water miscible solvent which is volatile under ambient conditions, such as a lower alkanol.

As used herein the term "ethylene oxide (EO) content" refers to the weight percent amount determined for any polyalkoxylate by subtracting the molecular weight of the active hydrogen compound(s) used to make the polyalkoxylate from the number average molecular weight of the same polyalkoxylate, dividing by the number average molecular weight of the polyalkoxylate and multiplying the result by 100%. For polyalkoxylates containing ethylene oxides and other alkylene oxides, the above calculation is modified to account for the relative amounts of ethylene oxide and the other alkylene oxides used to make the polyalkoxylate. Thus, for example, if 2 parts ethylene oxide and 3 parts propylene oxide are used to make a polyalkoxylate having a number average molecular weight of 1000 from ethylenediamine (fw=64), the total weight % of alkylene oxide is (1000−64)/1000×100% or 93.6% and the ethylene oxide content is 2/5×93.6% or 37.44 wt. %.

As used herein, unless otherwise indicated, the phrase "measured glass transition temperature" or "measured Tg" refers to a Tg as determined by differential scanning calorimetry (DSC), including preheating the polymer to 120° C., rapidly cooling it to −100° C., and then heating to 150° C. at a heating rate of 20° C./minute while collecting data. The Tg recorded was the midpoint of the inflection of the heat flow versus temperature curve using the half-height method.

As used herein, unless otherwise indicated, the term "emulsion polymer" refers to a polymer made by aqueous emulsion polymerization.

As used herein, the term "ethylenically unsaturated carboxylic acid monomer" refers to acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, β-styrylacrylic acid, maleic acid, itaconic acid, citraconic acid, and salts thereof.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "weight average molecular weight" refers to the weight average molecular weight as measured by gel permeation chromatography (GPC) against poly(methylmethacrylate) or poly(styrene) standards, respectively, for an acrylic or a vinyl emulsion polymer.

As used herein, unless otherwise indicated, the term "number average molecular weight" for a polyalkoxylate of the present invention refers to the number average molecular weight as measured by gel permeation chromatography (GPC) of the polyalkoxylate as a 100 microliter sample of a 0.25 wt. % solution in xylene against polystyrene standards at 40° C. using tetrahydrofuran (THF) as eluent flowing at 1 mL/min.

As used herein, unless otherwise indicated, the term "ethylene oxide content" refers to the number average amount of ethylene oxide groups in a given polyalkoxylate compound divided by the number average molecular weight of the polyalkoxylate compound.

As used herein, the term "pigment volume concentration" or % PVC refers to the quantity calculated by the following formula:

$$\% \, PVC = \frac{\left(\begin{array}{c}\text{volume of pigment}(s) + \text{volume extender}(s) + \\ \text{volume of filler}(s)\end{array}\right)}{(\text{Total dry volume of paint})} \times 100$$

As used herein, the term "phosphorus acid" refers to any acid containing a phosphorus atom, including, for example, phosphoric acids or their salts, phosphonic acids or their salts, phosphinic acids or their salts, and polyphosphoric acids or their salts.

As used herein, the term "vinyl or acrylic emulsion polymer" refers to a polymer made from one or more different monomers, such as a copolymer, a terpolymer, a tetrapolymer, a pentapolymer etc., or any of a random, block, graft, sequential or gradient polymer.

As used herein, the term "total polymer solids" or "polymer solids" means the total solids of the one or more vinyl or acrylic emulsion polymers and the polyurethanes or polyurethane prepolymers in the aqueous compositions.

As used herein, the term "solids" refers to any material that is not volatile at 100° C. Thus, the concept of solids excludes volatile solvents, water and ammonia.

As used herein, the term "normal boiling point" refers to the boiling point of a liquid at 100 kPa (760 mm/Hg).

As used herein, the phrase "wt. %" stands for weight percent.

As used herein, unless otherwise indicated, the term "weight average particle size" means the particle size as determined by light scattering (LS) using a Brookhaven 90 Plus particle size analyzer (Brookhaven Instruments Corp., Holtsville, N.Y.).

All ranges recited are inclusive and combinable. For example, a recitation of a functionality (f) of from 2 to 15 or, preferably, from 3 to 10, or, more preferably, from 3 to 8 means any or all of from 2 to 15, from 2 to 10, from 2 to 8, from 2 to 3, from 3 to 15, from 8 to 15, from 10 to 15, or, preferably, from 3 to 10, or, preferably, from 3 to 8, or, preferably, from 8 to 10, or, more preferably, from 3 to 8.

The present inventors have discovered that additive compositions comprising one or more phosphorus acid salts and one or more polyalkoxylates having from 2 to 15 or, preferably, up to 8 polyalkoxylate chains and having from 20 to 70 wt. % of ethylene oxide groups, based on the weight of total polyalkoxylate solids, can make aqueous compositions having emulsion polymers or other polymer binders for use as paints and coatings with significant improvements in open time and yet with little detrimental impact on paint properties, such as film formation and blocking or stain resistance. The open time additives of the present invention comprise liquids and can be provided at close to 100 wt. % solids with remarkably low viscosities, thereby enabling ease of additive handling alone or in combination with other additives. The open time additives of the invention and the aqueous compositions containing them are also zero VOC.

The (i) additive compositions comprise one or more polyalkoxylates that can be represented by the formula I-[AO$_n$H]$_f$ wherein I is an organic active hydrogen containing compound, AO is an alkylene oxide that comprises ethylene oxide (EO) or EO combined with propylene oxide (PO) and/or butylene oxide (BO) in a random order or in an oligomer having blocks, preferably, at least one block of EO, wherein n is the total number of AO groups and may range from 1 to 50, or, preferably, from 2 to 20; and, wherein f is the functionality or the total number of active hydrogen groups in I, which ranges from 2 to 15 or, preferably, from 3 to 10, or, more preferably, from 3 to 8.

Suitable active hydrogen compounds I for making the polyalkoxylates of the present invention may be chosen from diols, such as glycols, phenols having 2 hydroxyl groups, such as cresols; and difunctional aminoalcohols like diethanol amine; polyols having 3 or more hydroxyl groups, such as glycerol, pentaerythritol, sugar alcohols like sorbitol, xylitol or mannitol; diamines, such as ethylenediamine; triamines, such as diethylenetriamine; polyamines, such as polylysine or polyethylene imines; phenolic resins having from 2 to 15 or, preferably, from 2 to 8 or, preferably, 3 or more, hydroxyl groups, such as hydroxyl functional phenol formaldehyde resins; epoxy adducts of glycidyl ether with polyols; epoxy adducts of glycidyl ethers with diamines or polyamines, such as disecondary diamines. Preferably, the active hydrogen compounds are polyols having 3 or more hydroxyl groups, difunctional aminoalcohols, diamines, triamines, polyamines and phenolic resins having 3 to 8 hydroxyl groups. A sugar alcohol is considered a polyol in the present invention.

The ethylene oxide (EO) content of the polyalkoxylates of the present invention may be anywhere from 20 to 70 wt %, or, preferably, from 20 to 50 wt. %, based on the total weight of solids in the polyalkoxylate. The EO content should be sufficiently large to make the polyalkoxylate water dispersible, and yet low enough that the polyalkoxylates little enough to be compatible with the (ii) one or more emulsion polymer.

The number average molecular weight or Mn of the polyalkoxylates of the present invention may range from 800 to 10,000 or, preferably, 6,000 or less. Too high an Mn may result in gelling and/or flocculation or an aqueous composition containing the polyalkoxylate. Preferably, the Mn of the polyalkoxylate of the present invention ranges 800 to 5000.

Examples of polyalkoxylates may include, for example, di-polyethoxylated diols like propylene glycol, tri-polyethoxylated triols, like glycerine, polyethoxylated polyols having four or more active hydrogen groups, such as polyethoxylated pentaerythritol, di-, tri-, or tetra-polyethoxylated diamines, tri- or higher-polyethoxylated polyamines, such as, penta-polyethoxylated triethylene pentamine, and ethoxylated alkyl phenol formaldehyde resins containing two or more poly(alkoxylate) chains.

The one or more polyalkoxylates of the present invention can be made in a conventional fashion by reacting the active hydrogen compound with ethylene oxide or a combination of ethylene oxide as well as propylene oxide and/or butylene oxide.

The reaction of the active hydrogen compound with ethylene oxide to make the polyalkoxylates (ii) of the present invention can be carried out in a pressure reactor or autoclave at from 50 to 200° C., or, preferably, from 90 to 150° C. at a pressure of from 100 to 2000 kPa. A basic catalyst may be used, such as sodium methanolate, an alkali metal hydroxide like NaOH or KOH.

The (i) additive compositions of the present invention can be made by reacting the one or more polyalkoxylates in an aqueous compositions with a phosphorus acid, followed by reacting the resulting product with aqueous ammonia, a quaternary ammonium compound or caustic in the form of an alkali(ne earth) metal hydroxide. These reactions take place readily at ambient temperature in water.

The aqueous compositions of the present invention include water or water having dissolved therein a low VOC water miscible organic solvent, such as methanol, ethanol and glycol ether. Water is preferred.

The aqueous polymer compositions (ii) of the present invention may be chosen from aqueous dispersion polymers, such as polyurethane dispersions and polyolefin dispersions, aqueous emulsion polymers and mixtures thereof. In the compositions of the present invention that comprise one or more polymer, the additives (i) comprise a much lower solids proportion relative to the solids of the whole composition.

The aqueous polymer compositions (ii) of the present invention include emulsion polymers that may be prepared from one or more polymerizable ethylenically unsaturated monomers, such as, for example, methyl (meth)acrylate, ethyl (meth)acrylate, or ethylhexyl acrylate.

Suitable nonionic ethylenically unsaturated monomers for making the emulsion polymers (ii) of the present invention may, include vinyl aromatics, such as styrene and α-methyl styrene; butadiene; olefins; vinyl esters; vinyl halides; vinylidene chloride; (meth)acrylonitrile; $C_4$-$C_{24}$ alkyl esters of (meth)acrylic acid; for example, n-butyl methacrylate, 2-ethylhexyl (meth)acrylate, and other (meth)acrylates.

Suitable polymerizable monomers for making the emulsion polymers (ii) of the present invention may further include, in copolymerized form, from 0 to 5 wt. %, based on the total weight of monomers used to make the polymer, of at least one multiethylenically unsaturated monomer. Examples of multiethylenically unsaturated monomers that may be used include allyl (meth)acrylates; glycol di(meth)acrylates; and aromatic di- and tri-vinyl monomers, such as, divinylbenzene, and divinyltoluene.

The emulsion polymers (ii) of the present invention may further contain, in copolymerized form, amide containing monomers, like (meth)acrylamide, or ionic ethylenically unsaturated monomers such as ethylenically unsaturated carboxylic acid monomers, such as (meth)acrylic acid, itaconic acid and maleic acid.

Preferably, the emulsion polymers (ii) of the present invention comprise copolymerized ethylenically unsaturated carboxylic acid monomers. When such acid monomers are in their deprotonated form, as at a pH below the pKa of the acid monomers themselves, they can be referred to as anionic monomers.

Suitable levels of copolymerized ethylenically unsaturated carboxylic acid monomers or their salts in the emulsion polymers (ii) of the present invention may range from 0 to 10 wt. %, preferably, 0.1 to 5 wt. %, and, more preferably, 0.5 to 2.5 wt. %, based on the total weight of monomer solids used to make the polymer.

Suitable ethylenically unsaturated carboxylic acid monomers for use in making the emulsion polymers (ii) of the present invention may also include multi-acid functional groups that are formed from ethylenically unsaturated monomers and that contain multiple acid groups. The multi-acid functional groups may be incorporated into the polymer particle, for example, by including as polymerized units, a terminally unsaturated multiacid macromonomer.

The emulsion polymers (ii) of the present invention may optionally have one or more strong acid functional groups from monomers, in copolymerized form, such as, for example, a phosphorus acid group, a sulfur acid group, salts thereof, and combinations thereof. The phosphorus acid-functional group may be a (di)hydrogen phosphate group, phosphonate group, phosphinate group, alkali metal salt thereof, other salt thereof, or a combination thereof. The emulsion polymers (ii) may contain such strong acid functional groups in copolymerized form at levels ranging from 0.0 to 10 wt. %, preferably, up to 5 wt. %, and, more preferably, up to 3.5 wt. %, based on the weight of the monomer solids used to make the copolymer.

Suitable phosphorus acid group containing monomers may include, for example, (di)hydrogen phosphate esters of an alcohol containing a polymerizable vinyl or olefinic group, such as phosphates of hydroxyalkyl(meth)acrylates including hydroxyethyl (meth)acrylate. Other suitable such monomers may include, for example, phosphonate functional monomers, like vinyl phosphonic acid. Preferred phosphorus acid monomers include phosphoethyl (meth) acrylate.

Other suitable polymerizable monomers for making the emulsion polymers (ii) of the present invention may include, for example, hydroxy-, amine-, epoxy-, and keto-functional monomers, autooxidizable monomers like acetoacetoxy group containing monomers, such as acetoacetoxyalkyl (meth)acrylates, and small amounts of adhesion-promoting monomers; as well as polymerizable surfactants, including, but not limited to, the monomers sold as Trem™ LF-40 (Henkel Corporation, King of Prussia, Pa.).

Suitable autooxidizable monomers may include, for example, ethylenically-unsaturated acetoacetoxy group containing monomers may include acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof.

Preferred fast dry aqueous compositions of the present invention may comprise one or more polyamine, which may be an emulsion polymer. Polyamine emulsion polymers of the present invention may be made from suitable amine containing monomers, such as, for example, aminoalkyl vinyl ethers or sulfides; amine containing acrylamide or (meth)acrylic esters, such as dimethylaminoethyl (meth) acrylate; N-(meth)acryloxyalkyl-oxazolidines, such as poly (oxazolidinylethyl methacrylate), N-(meth)acryloxyalkyltetrahydro-1,3-oxazines, and monomers that readily generate amines by hydrolysis, as disclosed in U.S. Pat. No. 5,804,627.

To limit the water sensitivity of the emulsion polymers (i) of the present invention, the total amount of phosphorus acid, multi-acid, acid, hydroxyl, amine, ketone, aldehyde, aldol, keto-ester (acetoacetoxy), or aldimine group functional groups in or used to make the copolymer should not exceed 25 wt. %, or, alternatively, should not exceed 20 wt. %.

Emulsion polymers (ii) useful in the aqueous compositions of the present invention may be prepared by conventional polymerization processes, including suspension or emulsion polymerization at known polymerization temperatures of from room temperature to about 90° C. which may be optimized for the catalyst system employed. The emulsion polymers may have a unimodal or a multimodal, including a bimodal, particle size distribution.

Suitable emulsion polymerization techniques are well known in the polymer arts, and may include single stage processes and multiple stage polymerization processes. In the latter case, the first stage polymer can be prepared by various techniques, such as solution polymerization, bulk polymerization or emulsion polymerization. Preferably, emulsion polymerization is used.

The emulsion polymerization techniques used for preparing multi-stage polymer particles are well known in the art and are disclosed, for example, in the U.S. Pat. Nos. 4,325,856, 4,654,397 and 4,814,373. Polymerization may be carried out using one or more water-soluble or water-insoluble polymerization initiators which thermally decompose(s) at the polymerization temperature to generate free radicals, such as, for example, persulfates, like ammonium or alkali metal (potassium, sodium, or lithium) persulfate.

Emulsion polymerization initiators may be used alone or as the oxidizing component of a redox system, which also includes a reducing component, such as, for example, ascorbic acid or sodium formaldehyde sulfoxylate. Examples of redox catalyst systems include t-butyl hydroperoxide/sodium formaldehyde sulfoxylate/Fe(II), and ammonium persulfate/sodium bisulfite/sodium hydrosulfite/Fe(II). The initiator and the optional reducing component may be used in proportions from 0.001% to 5% each, based on the weight of the ethylenically unsaturated monomers in the monomer mixture to be polymerized. Accelerators such as chloride and sulfate salts of cobalt, iron, nickel, or copper may be used in small amounts.

Chain transfer agents, such as mercaptans, polymercaptans, and polyhalogen compounds, including alkyl mercaptans such as n-dodecyl mercaptan, may be used to control the molecular weight of the emulsion polymers of the present invention. Amounts of these may range from 0 to 10 wt. %, based on the total weight of the ethylenically unsaturated monomers used to prepare the vinyl or acrylic emulsion polymers. Aggregation of the aqueous polymer compositions of the present invention (ii) may be discouraged by including a stabilizing surfactant in the polymerization mixture in the polymerization vessel. Many examples of surfactants suitable for emulsion polymerization are given in *McCutcheon's Detergents and Emulsifiers* (MC Publishing Co., Glen Rock, N.J.), published annually. Other types of stabilizing agents such as protective colloids, may also be used. For example, methyl cellulose and hydroxyethyl cellulose may be included in the polymerization mixture.

The aqueous polymer compositions (ii) of the present invention may be prepared as an aqueous dispersion or suspension with a solids level of from 20 to 70 wt. %, or, preferably, in the range of from 30 to 60 wt. %.

The aqueous polymer compositions of the present invention that contain one or more (ii) emulsion polymers are preferably high solids or fast dry coating compositions.

Preferably, the aqueous coating compositions of the present invention that have one or more (ii) emulsion polymers may have very high total solids contents of from 50 to 85 wt. %, or up to 80 wt. %. Such compositions tend to be fast drying.

Preferably, the aqueous polymer compositions of the present invention comprise high solids aqueous polymer compositions, elastomeric aqueous polymer compositions or fast dry aqueous polymer compositions.

Preferably, the aqueous polymer compositions of the present invention may have very high total solids contents of from 50 to 85 wt. %, or up to 80 wt. %. Such compositions tend to be fast drying.

Suitable fast dry compositions may include one or more polyamines in compositions that have a pH of from 7 to 11.5 or, preferably, 8 or higher.

The aqueous polymer compositions of the present invention may comprise one or more filler, extenders and/or pigments, even if the compositions are not coating compositions, for example, if the compositions are non-cementitious binder compositions, such as may be used for waterproofing membranes or EIFS topcoats. Suitable concentrations of fillers, extenders and/or pigments may range from 50 to 90 wt. % or, preferably, from 60 to 85 wt. %, of total solids.

The aqueous polymer compositions of the present invention may have, for example, a percent pigment volume concentration (% PVC) of from 0 to 80%, or 20% or higher, or, preferably, from 40 to 75%, or, more preferably, 40% or more or up to 65%. The compositions having a % PVC of 40% or more may be high solids compositions. Such compositions may have low total polymer solids proportions of from 10 wt. % to 40 wt. %, or, preferably, 15 wt. % or more, or, preferably, up to 25 wt. %, all wt. % s based on the total weight of the aqueous compositions.

Suitable fillers or extenders for use in the aqueous coating compositions of the present invention may include, for example calcium carbonate, silicas, silicates, like dolomite or aluminum silicates, talcs, nepheline syenite, ceramics like calcium oxide, quartz(ite), glass or polymeric microspheres, cement, and silica sand. Preferred is calcium carbonate and silicates.

In the aqueous polymer compositions of the present invention, silica may be used at from, 0 to 40% PVC, preferably 0 to 25% PVC; nepheline syenite or other aluminum silicates may be used 0 to 40% PVC, preferably 0 to 25% PVC.

Suitable pigments for use in the aqueous coating compositions of the present invention may include titanium dioxide, organic pigments, carbon black and iron oxides. Inorganic pigment amounts may range from 0 to 15% PVC, preferably, from 3 to 10% PVC.

Opaque polymers as pigments may be used at from 0 to 30% PVC, or, preferably to 0 to 15% PVC. Opaque polymers are considered pigment and not binder for % PVC calculations.

The aqueous coating compositions of the present invention may contain additional ingredients, such as, for example, surfactants, dispersants, thickeners, such as polyvinyl alcohol (PVA), hydroxyethyl cellulose (HEC), associative thickeners, such as, for example, hydrophobically-modified, alkali soluble emulsions (HASE), hydrophobically-modified ethylene oxide-urethane polymers (HEUR), and hydrophobically-modified hydroxy ethyl cellulose (HMHEC), alkali-soluble or alkali-swellable emulsions (ASE), other cellulosic thickeners, and attapulgite clay; rheology modifiers; silanes, colorants; coalescents and plasticizers; crosslinking agents; tackifiers; dispersants; wetting agents; dyes; sequestering agents; preservatives, biocides and mildewcides; anti-freeze agents; slip additives; waxes; defoamers; corrosion inhibitors; anti-flocculants; and ultraviolet light absorbers, such as benzophenone. HEC is the preferred thickener.

Suitable dispersants for use in the present invention may include one or more non-ionic, or anionic dispersants, such as, for example, carboxylic acids, and anionic polymers such as homopolymers and copolymers based on polycarboxylic acids, including those that have been hydrophobically- or hydrophilically-modified, e.g. poly(meth)acrylic acid with various comonomers such as styrene, or alkyl(aryl) (meth) acrylate esters.

One or more surfactants may be used to stabilize an aqueous polymer composition after polymerization of monomers or in the formation of polymer dispersions and may be present at levels of from 0.1 to 8 wt. % based on the total weight of monomer in polymerization. Suitable surfactants include cationic, anionic, and non-ionic surfactants.

The aqueous compositions of the present invention, whether or not they have one or more (ii) aqueous polymer compositions, may comprise from 0.1 to 5 wt. % or, preferably, from 0.1 to 2 wt. %, based on the total weight of solids in the composition, of a coalescent. A coalescent may comprise, for example, any ingredient that facilitates the film formation of an aqueous polymeric dispersion, such as by lowering the minimum film forming temperature ("MFFT") of the composition as measured according to ASTM International Publication ASTM D 2354-10 (2010, ASTM international, West Conshohocken, Pa.), West Conshohocken, Pa. Suitable coalescents may comprise glycol esters, bis-glycol ether esters or glycol ether esters with a normal boiling point of from 280 to 450° C.

Non-inclusive examples of glycol ether esters are diethylene glycol phenyl ether benzoate, tripropylene glycol methyl ether benzoate, dipropylene glycol phenyl ether levulinate, and tripropylene glycol n-butyl ether isopentanoate. Non-inclusive examples of bis-glycol ether esters are bis-dipropylene glycol n-butyl ether adipate, bis-diethylene glycol n-butyl ether malonate, bis-diethylene glycol n-butyl ether succinate, and bis-dipropylene glycol n-butyl ether maleate. Such coalescents can be prepared as disclosed in U.S. Patent Publication No. 2012/0258249A, to Adamson et al. Still other suitable coalescents are propylene glycol phenyl ether, ethylene glycol phenyl ether, dipropylene glycol n-butyl ether, ethylene glycol n-butyl ether benzoate, tripropylene glycol n-butyl ether, TEXANOL™ 2,2,4-trimethyl-1,3-pentanediol monoisobutyrate (Eastman Chemical, Kingsport, Tenn.), Optifilm™ Enhancer 400 triethylene glycol bis-2-ethylhexanoate (Eastman), tributyl citrate, and/or glycol ether ester-compounds, such as those disclosed in U.S. Patent Publication No. 2012/0258249A.

The aqueous coating compositions of the present invention may further include one or more silanes, such as, e.g. oxysilanes, amino alkoxy silanes or epoxy alkoxy silanes.

Preferably, the one or more silanes comprises an amino silane or a diamino silane, or, more preferably a hydrolysable amino silane or diamino silane. Examples of such preferred silanes may include, for example, N-ethylaminopropyltrimethoxy silane, aminoethylaminopropylmethyldimethoxy silane, aminoethylaminopropyl trimethoxy silane, aminopropylmethyldimethoxy silane, aminopropyltrimethoxy silane, such as those available from Dow Corning, Midland, Mich., Hulls of America, Piscataway, N.J., or Wacker Silicones Corporation, Adrian, Mich. One example is an aminoethylaminopropyltrimethoxy silane sold under the tradename Dow Corning Z-6020. Other suitable silanes may include, for example, oligomeric aminoalkylsilanes and polymeric aminoalkylsiloxanes.

The aqueous polymer compositions of the present invention may be used in architectural and industrial coatings, roof coatings, non-cementitious mortars, waterproofing membranes and exterior insulation finishing systems (EIFS). Various applications methods are known in the art, including spraying the composition on substrate. Other methods include applying the composition by hand using a trowel, paint brush or a paint roller. Coatings and compositions may be applied in one or more layer.

The aqueous coating compositions of the present invention are suitable for coating or forming films on substrates such as, for example, wood, metal or industrial substrates, building substrates and roadways; and find use in exterior insulation finishing systems (EIFS), walkways, runways, parking areas, and indoor floors (such as in factories or shopping malls). Typical building substrates include, for example, drywall, wood, plywood, masonry, concrete, cement, stone, stucco, tile, and combinations thereof; metals may include aluminum, stainless steel, or carbon steel; roadways include, for example, tar, asphalt, masonry, concrete; other substrates may include resins or polymeric materials. All of the substrates may already have one or more layers of an existing coating or paint which may be fresh or aged.

EXAMPLES

The following examples illustrate the present invention.

Abbreviations used in the Examples include: BA=butyl acrylate; MMA=methyl methacrylate; MAA=methacrylic acid; nDDM=n-dodecyl methacrylate; EHA=ethylhexyl acrylate; STY=styrene; BMA=butyl methacrylate; MPG=monopropylene glycol; DETA=diethylene triamine; DAnMDPA=3,3' diamino-N methyl dipropylamine Also used in the Examples are:

Acrylic emulsion polymer A (50 wt. % solids, one stage, BA/MMA emulsion polymer, Tg (DSC) <5° C.);

Acrylic acid copolymer dispersant (Tamol™ 165A, 21.50 wt. % solids, Dow);

Dioctyl sulfosuccinate surfactant (Triton™ GR-7M, Dow, 100 wt. % solids);

Mineral oil/silica defoamer (Drewplus™ L-475, Ashland Chemical, Houston, Tex., 100 wt. % solids);

Triethylene glycol bis-2-ethylhexanoate (Optifilm™ 400 coalescent, Eastman Chemicals).

Additives for open time of the invention are characterized in Table 1, below:

TABLE 1

Poly(alkoxylate) Additives Treated to Make Aqueous Salt Compositions

| Polyalkoxylate Salt | Initiator, I | Functionality, f | % EO | Mn |
|---|---|---|---|---|
| 1 | Sorbitol | 6 | 35.7 | 6000 |
| 2 | Di-ethylene Triamine | 5 | 25 | 5000 |
| 3 | Glycerine | 3 | 32 | 4500 |
| 4 | Diol (MPG) | 2 | 40 | 2500 |

The polyalkoxylates listed in Table 1, above, were treated with dry $P_2O_5$ and ammonium hydroxide to neutralize the mixture of polyalkoxylate and $P_2O_5$ and create a mixture of polyalkoxylate in a salt solution.

In Example 1, 102 g of the Example 1 polyalkoxylate was treated with 7.5 gm of $P_2O_5$ (3.1 moles $P_2O_5$ to 1 molar equivalent of the polyalkoxylate) at room temperature and neutralized with ammonium hydroxide to give a product with 72 wt. % solids as an ammonium salt. The resultant additive compositions are shown in Table 2, below.

In Example 2, 113 g of the Example 2 polyalkoxylate was treated with 3.9 gm of $P_2O_5$ (1.8 molar equivalents of the $P_2O_5$ to 1 equivalent of the polyalkoxylate) at room temperature and neutralized with ammonium hydroxide to give a product with 75 wt. % solids as an ammonium salt. The resultant additive compositions are shown in Table 2, below.

In Example 3, 100 g of the Example 3 polyalkoxylate was treated with 5.75 gm of $H_3PO_4$ (1 molar equivalent $H_3PO_4$ to 1 molar equivalent of polyalkoxylate) at room temperature and was neutralized with ammonium hydroxide to give a product with 68 wt. % solids of ammonium salt. The resultant additive compositions are shown in Table 2.

In Example 4, 100 g of the Example 4 polyalkoxylate was treated with 6.9 gm of $H_3PO_4$ (0.67 equivalents to 1 equivalent of polyalkoxylate) at room temperature and neutralized with ammonium hydroxide to give a product with 68 wt. % solids of ammonium salt. The resultant additive compositions are shown in Table 2.

TABLE 2

Polyalkoxylate Salt Compositions

| Polyalkoxylate Salt | Wt. % Solids | mmol/gm of Ammonium salt |
|---|---|---|
| 1S | 72 | 0.64 |
| 2S | 75 | 0.34 |
| 3S | 68 | 2.3 |
| 4S | 68 | 1.4 |

The additives in Examples 1S and 2S of Table 2, above, were added at 2 wt. %, as solids, of the total formulation to the aqueous coating composition shown in Table 3, below. The additives in Examples 3S and 4S of Table 2, above, were added at 1 wt. % of the total formulation to the aqueous coating compositions shown in Table 3, below. The additives were included in the letdown to make an aqueous paint composition.

TABLE 3

Aqueous Coating Composition with an Acrylic Emulsion Polymer at a 22% PVC and volume solids of 36 wt. %

| Material Name | Wt. parts |
|---|---|
| Grind | |
| Rutile TiO$_2$ slurry (76.5 wt. % solids in water, Ti-Pure ™ R-746, Chemours, Wilmington, DE) | 1584.45 |
| Polyacrylic acid dispersant (25 wt. % in water, Tamol ™ 731A, Dow) | 33.97 |
| Polyether siloxane surfactant (BYK 348, Byk Additives, Inc., Louisville, KY) | 4.53 |
| Polyether siloxane defoamer (Tego Foamex ™ 810, Evonik Industries, Parsippany, NJ) | 2.26 |
| Grind Sub-total | 1625.22 |
| Premix | |
| Water | 94.67 |
| Acrylic emulsion polymer A | 2374.41 |
| Ammonia (28%) | 3.17 |
| BYK 348 surfactant | 4.53 |
| Tego Foamex ™ 810 defoamer | 2.26 |
| Acrysol ™ RM-2020 NPR Hydrophobically modified ethoxylated urethane (HEUR) rheology modifier (Dow) | 138.15 |
| Acrysol ™ RM-8W (HEUR rheology modifier, Dow) | 19.48 |
| Water | 549.44 |
| Premix Sub-total | 3186.11 |
| Totals | 4811.33 |
| Property | Value |
| Total % PVC | 21.95 |
| Volume Solids | 36.44 |

The formulations were tested, as follows:

Open Time:

The indicated composition in a container was drawn down on a Leneta chart (B#4425 paper, Leneta company, Inc., Mahwah, N.J.), with a 125 micron (5 mil) square bar that is 10 cm (4") wide. Immediately after the drawdown was complete, a timer was started at 0 minutes. With a tongue depressor, two (2) parallel lines were drawn from the edge of the chart and running ⅓ of the length of the chart. A brush (2.54 cm nylon brush, Wooster model 4176, Wooster Brush Company, Wooster, Ohio) was dipped in the composition and brushed out on scrap paper. The container with the indicated composition was placed on a scale. Then, starting with the 1 minute time mark and repeating every min. thereafter, the brush was loaded so that from 1 to 2 cm (½ in.-¾ in.) of the bristles of the brush were dipped into the composition in the container so as to hold the desired amount of 0.6-0.7 gms of the composition on the brush, as determined by weighing the container with a scale. The loaded brush was placed down on the left side of the drawdown and brushed in a back and forth manner across the two scribed lines of the painted Leneta chart. Each stroke was counted as 1 (back and forth=2). In each minute, this was repeated until 20 strokes were completed; the brushing time was 30 seconds within each minute. This was continued every minute until "failure" was observed visually. Failure means the scribed lines did not disappear after brushing. The time for such failure was recorded as the open time of the composition. An average from a total of three trials of this experiment was taken for each Example indicated and the results were recorded as the open time of the composition in Table 4, below.

TABLE 4

Open Time Additive Performance

| Example @ 2 wt. % | Open time, mins |
|---|---|
| 1* | 8.3 |
| 2* | 12.5 |
| 1S | 15.3 |
| 2S | 17.3 |
| 3S | 12.3 |
| 4S | 6.3 |
| None* | 4 |

*Denotes Comparative Example

As shown in Table 4, above, aqueous coating compositions with the open time (i) additive composition of the present invention dramatically improved the open time of the aqueous compositions when compared to no such additive (None). The open time was especially improved when the (i) additive compositions included one or more phosphorus acid salt as in Examples 1S and 2S; compare Example 1S to Comparative Example 1; and compare Example 2S to Comparative Example 2.

We claim:

1. A low volatile organic content (VOC) aqueous composition comprising (i) an additive composition of one or more phosphorous acid salts and one or more polyalkoxylates having from 2 to 15 polyalkoxylate chains and an ethylene oxide (EO) content ranging from 20 to 70 wt. %, based on the total weight of solids in the polyalkoxylate.

2. The aqueous composition as claimed in claim 1, wherein the total amount the (i) additive composition ranges from 30 to 95 wt. %, as solids, in the aqueous composition.

3. The aqueous composition as claimed in claim 1, wherein the phosphorus acid salt concentration in the (i) additive composition ranges from 0.1 to 2 millimoles/g as solids, based on the total solids of the additive composition.

4. The aqueous composition as claimed in claim 1, wherein the (i) additive composition comprises one or more polyalkoxylates of the formula I-[AO$_n$H]$_f$, wherein I is an organic active hydrogen containing compound; wherein AO is an alkylene oxide that comprises ethylene oxide (EO) or EO combined with propylene oxide (PO) and/or butylene oxide (BO) in a random order or in an oligomer having blocks, wherein n is the total number of AO groups, which ranges from 1 to 50; and, wherein f is the total number of active hydrogen groups in I, which ranges from 2 to 15.

5. The aqueous composition as claimed in claim 4, wherein f ranges from 3 to 10.

6. The aqueous composition as claimed in claim 1, wherein in the (i) additive composition, the one or more phosphorus acid salts is a phosphate or a polyphosphate salts with a cation chosen from alkali metals, alkaline earth metals, ammonium, and quaternary ammonium groups.

7. The aqueous composition as claimed in claim 1, wherein the (i) additive composition has one or more polyalkoxylates that is a polyalkoxylate of an active hydrogen compound chosen from polyols having 3 or more hydroxyl groups, difunctional aminoalcohols, diamines, triamines, polyamines, and phenolic resins having 3 to 8 hydroxyl groups.

8. The aqueous composition as claimed in claim 1, wherein in the (i) additive composition, at least one of the one or more polyalkoxylates has a number average molecular weight (Mn) of from 800 to 10,000.

9. The aqueous composition as claimed in claim 1, which is an aqueous polymer composition that further comprises (ii) one or more aqueous polymer chosen from emulsion polymers, aqueous dispersion polymers and mixtures thereof and wherein the amount of (i) the additive composition ranges from 0.1 to 5 wt. % as solids, based on the total weight of solids in the aqueous composition.

10. A method of making a coated substrate comprising applying the aqueous polymer compositions as claimed in claim 9 onto a substrate and allowing it to dry to form a coated substrate.

* * * * *